Jan. 7, 1941. C. VAN NESS Re. 21,688
UTENSIL
Original Filed May 14, 1940
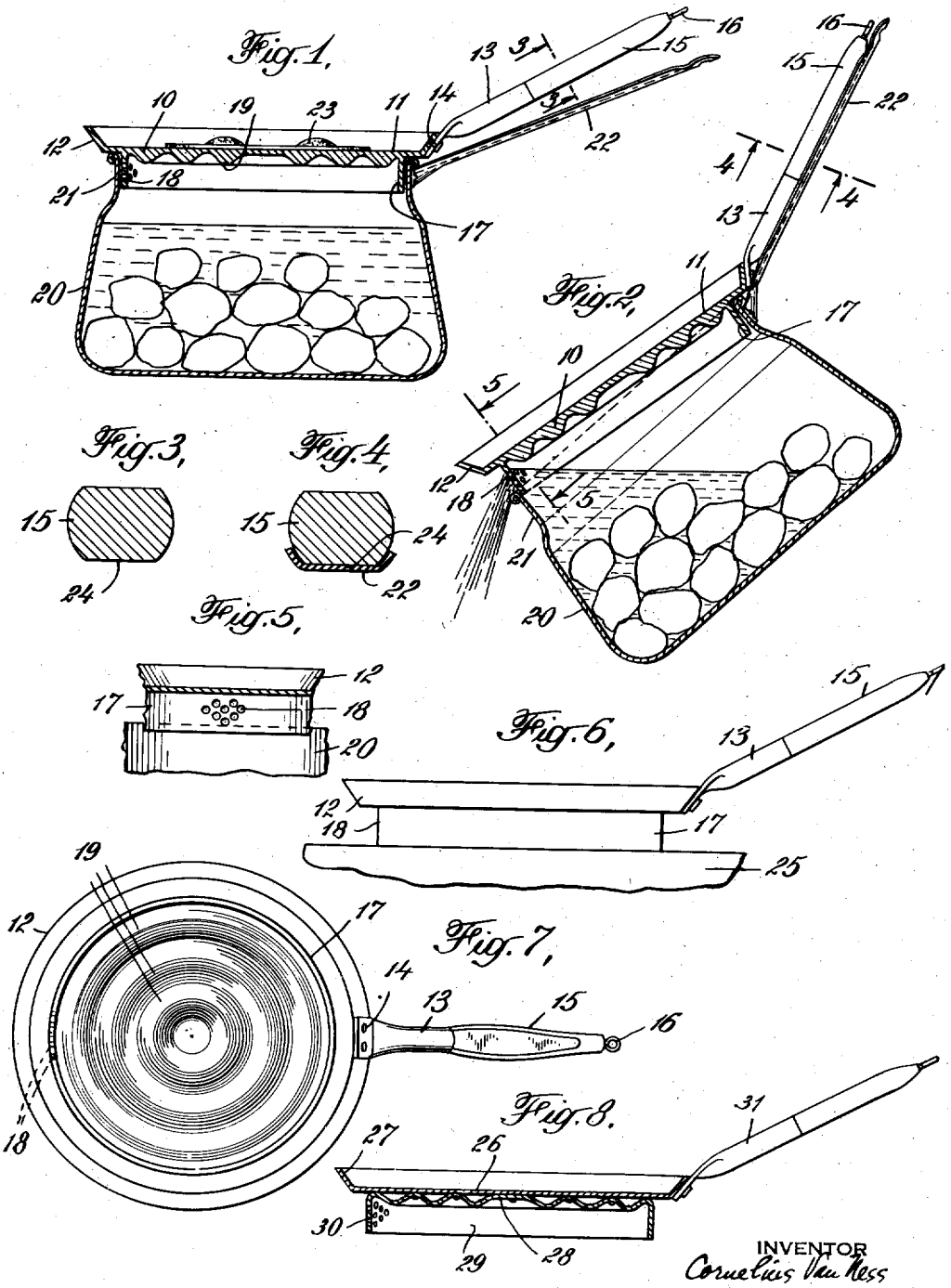
INVENTOR
Cornelius Van Ness
BY
Fennie Davis Marvin & Edmonds
ATTORNEYS Reissued Jan. 7, 1941

Re. 21,688

UNITED STATES PATENT OFFICE 21,688

UTENSIL

Cornelius Van Ness, New Canaan, Conn.

Original No. 2,218,367, dated October 15, 1940, Serial No. 335,076, May 14, 1940. Application for reissue November 8, 1940, Serial No. 364,910

8 Claims. (Cl. 53—7)

This invention relates to utensils for cooking purposes and is concerned more particularly with a utensil of novel construction which can be employed either alone or in combination with other utensils in carrying on cooking operations of various sorts.

The new utensil may be used to serve both as a cover or top for a pot or similar vessel and as a frying pan or skillet and in either case, it offers important advantages over utensils of standard construction employed for those purposes. Thus, when used as a pot top, the new utensil not only keeps the pot tightly closed but may also be employed for heating or cooking articles of food, receiving heat for the purpose from the steam in the pot and also from the neck thereof. When the articles within the pot have been cooked to the desired condition, the new top can be so manipulated as to permit the liquid to be poured off while the solid contents are held back, and this operation can be performed by a person using one hand and without danger of his being scalded by the steam escaping with the liquid.

When used as a frying pan or skillet, the utensil of the invention is placed on the stove in the usual way and the construction of the utensil is such that that part on which the food is cooked is spaced from the hot surface of the stove. As a consequence, the food is more uniformly heated and cooked than it would be if an ordinary frying pan were used, and the means by which the cooking section of the utensil is supported also serves to strengthen and stiffen the latter against warping.

For a better understanding of the invention, reference may be made to the accompanying drawing, in which:

Fig. 1 is a vertical sectional view through a pot and the utensil of the invention used as a top for the pot;

Fig. 2 is a view similar to Fig. 1 and showing how the utensil is manipulated to permit the liquid contents of the pot to be poured off;

Figs. 3 and 4 are sectional views on the lines 3—3 and 4—4, respectively, of Figs. 1 and 2;

Fig. 5 is a sectional view on the line 5—5 of Fig. 2;

Fig. 6 is a view of the utensil in side elevation, showing its use as a frying pan;

Fig. 7 is a bottom plan view of the utensil; and

Fig. 8 is a vertical sectional view of a modified form of the utensil.

Referring to the drawing, the utensil in the form illustrated comprises a plate 10 which is made of a suitable metal, such as aluminum, and has a flat upper surface 11 which is ordinarily circular in form. The plate is provided with a peripheral flange 12 which preferably extends upwardly and outwardly, as at an angle of about 45°, and attached to the plate is a handle 13. The handle extends generally radially from the plate and is inclined upwardly and it may be secured to the outer surface of flange 12 in any suitable manner, as by a rivet 14. The handle is preferably so constructed as to transmit heat slowly and in the utensil illustrated, the handle consists of a metal socket secured to the plate and provided with a wooden extension 15 in which the end of eyelet 16 may be threaded so that the utensil can be hung up.

Projecting downward from the under surface of the utensil is a circular flange 17 which is solid except for an opening which is across the plate from the handle. Preferably there are a number of perforations 18 at this point rather than a single large opening, although a single opening in the form of a slit may be employed, if desired. Within the flange 17, the under surface of the plate may be formed to have an increased surface area, as, for example, by concentric corrugations 19. The utensil illustrated in Fig. 1 is made by casting with the flanges 12 and 17 integral with the plate and the corrugations formed by thickening the plate in the appropriate manner.

In the use of the utensil as a pot top, it is placed on the pot 20 with the lower flange entering the neck 21 of the pot. This flange is of a diameter slightly less than that of the neck of a pot of conventional size, as, for example, slightly less than 7". When in position on the pot, the under surface of the plate outside the flange 17 rests on top of the rim of the neck and the perforations 18 are closed by the neck. The handle 13 of the top then lies above and at any angle to the handle 22 of the pot which is ordinarily either flat or of the upward concave formation shown in Fig. 4.

With the utensil mounted on the pot to serve as a cover, the pot may be used in the usual way for cooking vegetables or other articles of food in liquid. During the cooking, the utensil becomes heated by the steam arising from the liquid and confined within the pot and heat is also transmitted to the utensil through the neck of the pot. The upper surface of the plate may, accordingly, be used in the ordinary manner of a frying pan, as, for example, to fry eggs, as indicated at 23. In such use, the articles being cooked on the utensil and the fat used to grease the cooking surface of the utensil are confined by the flange 12. The utensil thus makes it possible to carry on two cooking operations over the same area of the stove and this is a matter of considerable importance in the case of electric or gas stoves which have only a relatively few burners or heating coils.

When the articles within the pot have been cooked to the desired extent and the liquid is to be drained off, the handle 13 of the utensil is depressed into contact with the handle 22 of the pot, the loose fit of the flange 17 in the pot neck permitting the utensil to be tilted for the purpose. The handle of the utensil has a flat under surface 24 and is of such shape and size that it will fit snugly into the concavity of the handle on the pot or else rest on the surface of that handle. The cook may, accordingly, hold both handles tightly together with the utensil slightly tilted, as shown in Fig. 2. When the utensil is in that position, the lower end of the flange 17 still lies within the neck of the pot, but the perforations 18 are exposed above the rim of the neck. The pot can, accordingly, be tipped to let the liquid escape through the perforations while the flange keeps the solid contents of the pot from being discharged. The utensil thus serves as a strainer in this use.

When the utensil is to be used as an ordinary frying pan, it is placed on the surface of the stove 25 and lies with the lower edge of the flange 17 in contact with the stove. The utensil may then be used in the same manner as an ordinary frying pan or skillet. When thus used in connection with an electric stove, the plate of the utensil is heated by radiant heat. With a gas stove, some of the flame may come in contact with the under surface of the plate and the gases of combustion then escape through the perforations 18. In either case, the increased area produced by the corrugations increases the rate at which the plate is heated and the elevation of the plate by the flange serves to insure uniformity in heat transmission to the plate and also stiffens the plate. With an ordinary stamped metal frying pan, the bottom surface of the pan is likely to become warped so that the grease used for cooking will accumulate at one side or the other and portions of the food may stick to the cooking surface and become burned. The provision of the flange 17 prevents such warping of the utensil.

Instead of making the utensil by casting, it may be made of stamped metal, and one form of utensil which may conveniently be produced by stamping operations is illustrated in Fig. 8. In the construction there shown, the utensil is made of an upper part consisting of a plate 26 having a flange 27 corresponding to the flange 12. Secured to the under surface of the plate, as by spot welding or the like, is the lower part of the utensil consisting of the plate 28 which is concentrically corrugated and is provided with the flange 29 having perforations 30. The handle 31 may then be secured to the flange 27 in any suitable manner. The utensil shown in Fig. 8 is lighter and cheaper than that shown in Fig. 1 but serves the same purposes and affords the same advantages.

I claim:

1. A utensil which comprises a plate having a flat top and a peripheral flange on its upper surface and an endless flange projecting downwardly from its under surface and spaced inwardly from the periphery of the plate, and a handle secured to the plate and extending radially upwardly and outwardly therefrom, the endless flange being provided with an opening therethrough at a place across the plate from the handle.

2. A utensil which comprises a plate having a flat top and a peripheral flange extending upwardly from its upper surface and an endless flange projecting downwardly from its under surface and spaced inwardly from the periphery of the plate, and a handle secured to the plate and extending radially upwardly and outwardly therefrom, the endless flange being provided with an opening therethrough diametrically opposite to the point of attachment of the handle.

3. A utensil which comprises a plate having a flat top and a peripheral flange extending upwardly and outwardly from its upper surface, an endless flange extending vertically downwardly from the under surface of the plate and lying inward from the periphery thereof, and a handle secured to the plate and extending outwardly therefrom, the endless flange having an opening across the plate from the point of attachment of the handle.

4. A utensil which comprises a plate having a flat top and a bottom surface concentrically corrugated, a flange extending upwardly from the top of the plate along the periphery thereof, an endless flange extending downwardly from the bottom surface of the plate and lying inward from the periphery thereof, the flange having an opening therethrough, and a handle secured to the plate at a point across the latter from the opening in the endless flange.

5. A utensil which comprises a pair of plates having central portions defined by peripheral flanges, the plates being of different diameters and being secured together with their central portions in contact and concentrically arranged, and a handle secured to the larger plate and extending radially therefrom, the smaller plate having an opening through its flange lying across the plate from the point of attachment of the handle.

6. A utensil which comprises a plate having a flat top and provided with an endless flange extending at right angles to one face of the plate and lying inwardly from the periphery thereof, the flange having an opening therethrough, and a handle secured to the plate and extending radially therefrom and upwardly away from the other face of the plate.

7. A utensil which comprises a plate having a flat top and a peripheral flange on its upper surface and an endless flange projecting downwardly from its under surface and spaced inwardly from the periphery of the plate, and a handle secured to the plate and extending radially outwardly therefrom.

8. A utensil which comprises a plate having a flat top adapted to serve as a cooking surface, said top being provided with an endless flange extending downwardly from the under surface of the plate and lying inward from the periphery thereof, and a handle secured to the plate and extending radially outwardly from the plate.

CORNELIUS VAN NESS.